Figure 3:
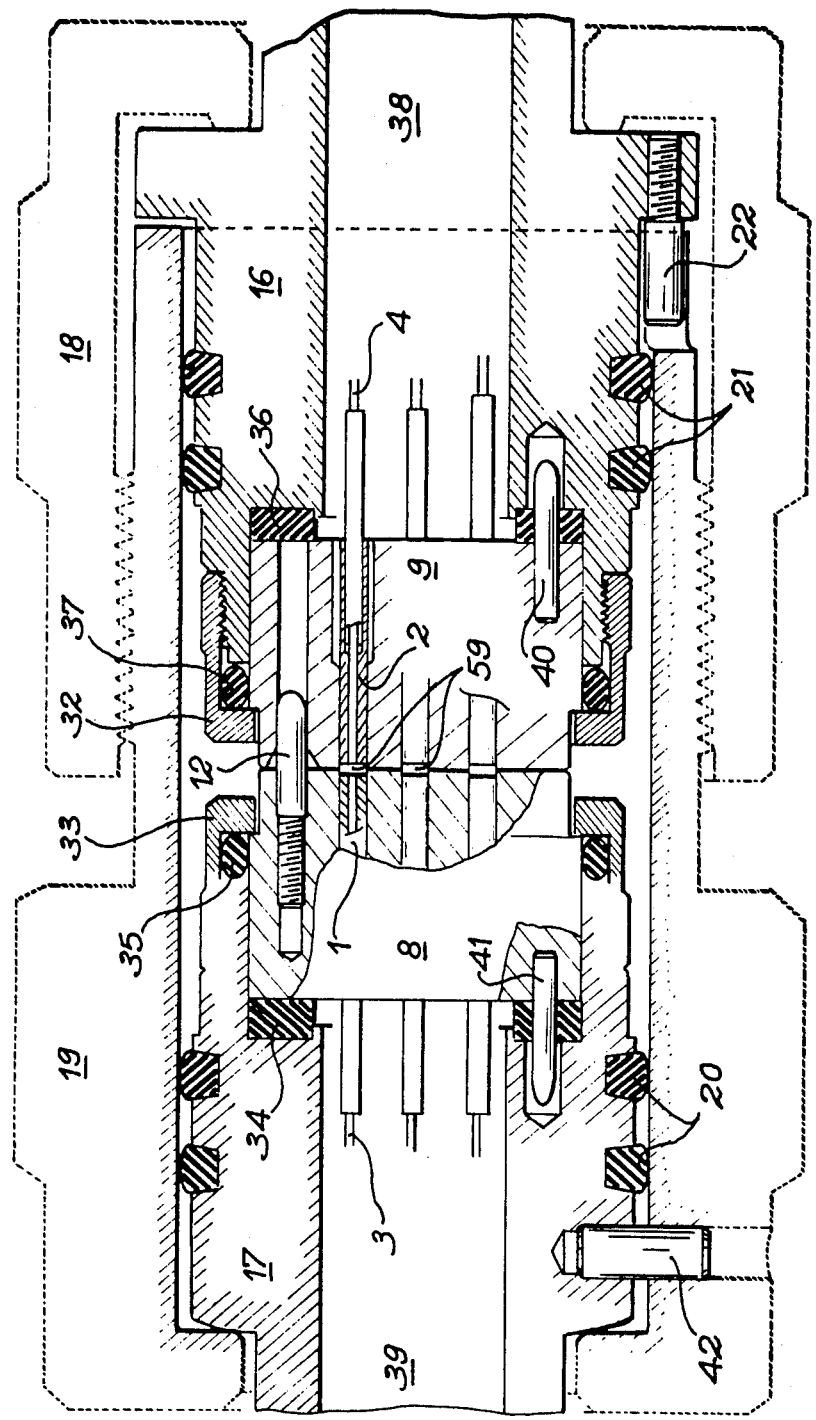

United States Patent [19]

Bientz et al.

[11] 4,396,248
[45] Aug. 2, 1983

[54] CONNECTOR FOR OPTICAL FIBRES

[75] Inventors: Andre Bientz, Malakoff; Bernard Kling, Boissy Sous Saint Yon, both of France

[73] Assignee: Commissariat a l'Energie Atomique, Paris, France

[21] Appl. No.: 223,228

[22] Filed: Jan. 7, 1981

[30] Foreign Application Priority Data

Jan. 11, 1980 [FR] France .............................. 80 00576

[51] Int. Cl.³ .............................................. G02B 7/26
[52] U.S. Cl. .................................................. 350/96.21
[58] Field of Search ............... 350/96.20, 96.21, 96.22

[56] References Cited

U.S. PATENT DOCUMENTS

| | | | |
|---|---|---|---|
| 4,082,421 | 4/1978 | Auracher et al. ................. | 350/96.22 |
| 4,140,366 | 2/1979 | Makuch et al. .................... | 350/96.22 |
| 4,178,068 | 12/1979 | Hoover ............................. | 350/96.21 |
| 4,198,122 | 4/1980 | Prunier et al. .................... | 350/96.21 |
| 4,215,913 | 8/1980 | Turley et al. ..................... | 350/96.21 |
| 4,277,135 | 7/1981 | Schrott et al. ................... | 350/96.21 |
| 4,309,071 | 1/1982 | Prunier ............................ | 350/96.21 |

FOREIGN PATENT DOCUMENTS 2265110 10/1975 France .
2388287 11/1978 France .
1536947 12/1978 United Kingdom ............ 350/96.21

*Primary Examiner*—John D. Lee
*Attorney, Agent, or Firm*—Pearne, Gordon, Sessions, McCoy, Granger & Tilberry

[57] ABSTRACT

A connector for optical fibres comprising means (1, 2) for retaining the extremities (3, 4) of fibres to be connected, means (7) for assembling and aligning the thus-retained fibres, said means being adapted to maintain the plane front surfaces (5, 6) of the fibres to be connected opposite to each other, so that the optical axes of said fibres be aligned, wherein said aligning and assembling means (7) contain a barrel in two parts (8, 9) provided with bores in which are respectively engaged the retaining means of said extremities to be connected, said two parts of said barrel having front surfaces (5, 6) opposite to each other and parallel with those of the fibres, as well as means (12) for aligning said fibres to be connected, removable means (18, 19), an internal portion of which is adapted to maintain said front surfaces (5, 6) of the two parts of said barrel in contact with each other through abutment means (16, 17), and resilient means (20, 21) adapted to maintain tightness about said front surfaces (5, 6) of the two parts of said barrel, inside said removable means (18, 19).

6 Claims, 4 Drawing Figures

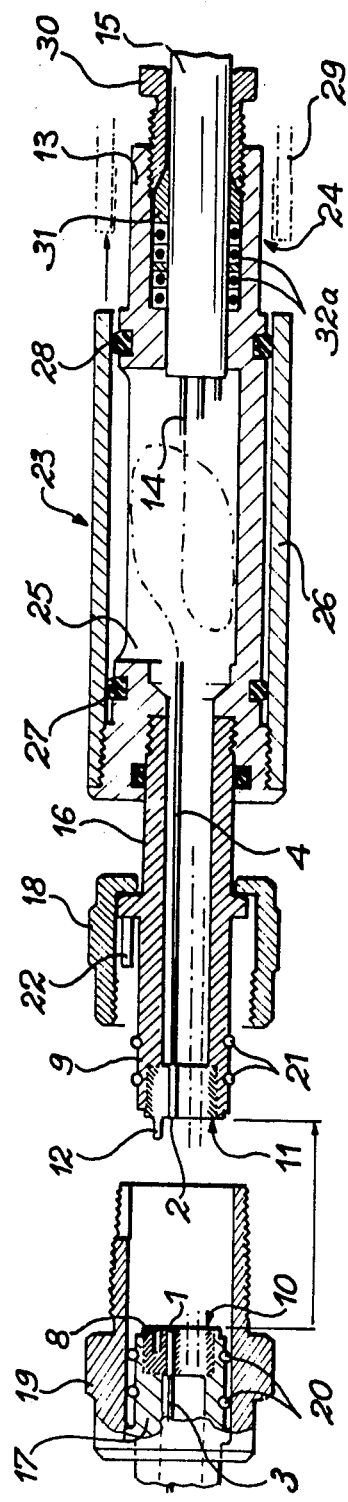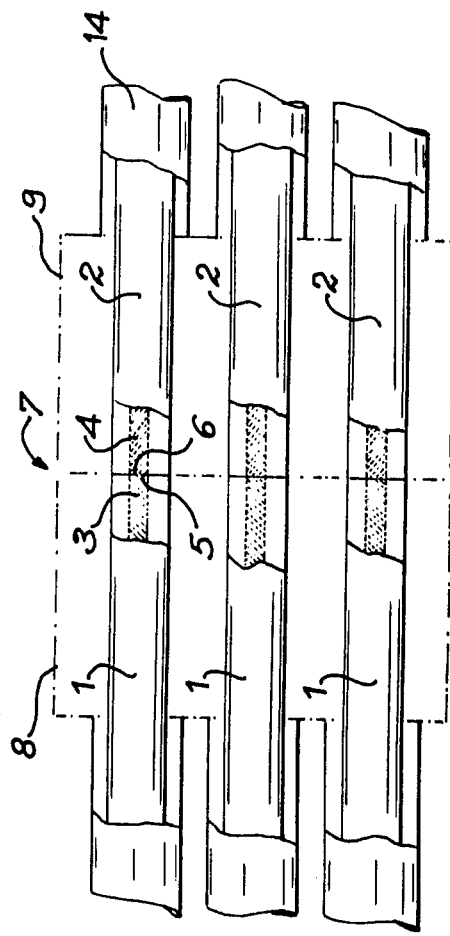
FIG. 1
FIG. 2

CONNECTOR FOR OPTICAL FIBRES

The present invention relates to a connector for optical fibres, and, more especially, to the connection of segments of optical fibres with a view to obtaining a long distance continuous connection for transmitting optical information.

It is known that the quality of the transmission of information via optical fibres is a function, in particular, of the quality of the couplings between the fibre segments of each transmission line. Indeed, the coupling between two fibre extremities must maintain the axial alignment of the fibres to be coupled and also maintain a slight spacing between the front surfaces at the extremities of the fibres to be coupled, since it is necessary to avoid a direct contact in order to protect the fibre extremities. The widespread use of optical fibres requires that the connections between segments of fibres be simple and rapidly made, while ensuring the alignment of the fibres as well as a slight spacing between the extremities of the fibres to be coupled. Finally, connectors for optical fibres should be in sealed relationship with respect of the environment and the coupling they permit to achieve must be fairly flexible in order to avoid any damaging of the fibre segments inside the connector, in particular in the case of external mechanical stresses. Said stresses can be longitudinal or transversal with respect to the fibres to be coupled.

Now, none of the connectors of the prior art permits a coupling between optical fibres providing at the same time the alignment of the coupled fibres, a slight spacing between the extremities of said fibres, a sealed relationship of the connector with respect to the environment and a fair flexibility with respect to external mechanical stresses.

One object of the present invention is to obviate said drawbacks and, in particular, to provide a connector for optical fibres capable of meeting the above requirements and, in addition, permitting an optical transmission of good quality following each dismounting and reassembly of said connector.

More specifically, the present invention relates to a connector for optical fibres comprising means for retaining the extremities of fibres to be connected, means for assembling and aligning the thus-retained fibres, said means being adapted to maintain the plane front surfaces of the fibres to be connected opposite to each other, so that the optical axes of said fibres be aligned, wherein said aligning and assembling means contain a barrel in two parts provided with bores in which are respectively engaged the retaining means of said extremities to be connected, said two parts of said barrel having front surfaces opposite to each other and parallel with those of the fibres, as well as means for aligning said fibres to be connected, removable means, an internal portion of which is adapted to maintain said front surfaces of the two parts of said barrel in contact with each other through abutment means, and resilient means adapted to maintain tightness about said front surfaces of the two parts of said barrel, inside said removable means.

According to a second feature of the present invention, said connector comprises, in addition, as an extension of said abutment means and in one part with the latter, a sleeve through which the fibres to be connected pass via a sealed passage, said sealed passage being so constituted as to permit the storage, inside said sleeve, of a fibre length greater than the inner length of said sleeve.

According to a third feature of the present invention, said means for retaining the extremities of fibres are constituted by rings respectively integral with the extremity of each fibre, said rings being engaged in said barrel bores, in such a manner that the front surface of each of said rings corresponds to the front surface of the respective fibre, the front surfaces of each fibre and of its respective ring being retracted with respect to the front surface of the corresponding part of said barrel.

According to a further feature of the present invention, the members for aligning fibres comprise at least one positioning stud adapted to be engaged in each of said parts of said barrel.

According to a still further feature of the present invention, said means for retaining the extremeties of fibres are constituted by rings integral with each fibre at the extremity thereof, in such manner that the front surface of each of said rings corresponds to the front surface of the respective fibre, the bores in a first part of said barrel being so designed that the front surfaces of said rings be retracted with respect to the front surface of said first part of said barrel, the bores in the second part of said barrel being so designed that the front surfaces of said rings be ahead of the front surface of said second part of said barrel, so that the junction of the fibre extremities is obtained in said first part of said barrel, said members for aligning the fibres being constituted by said rings of said second part of said barrel, said rings having an outer surface of conical shape in the portion thereof situated ahead of the front surface of said second part of said barrel, said conical outer surface being engaged in the partly conical inner surface of the corresponding bore of said first part of said barrel.

Figure 4:
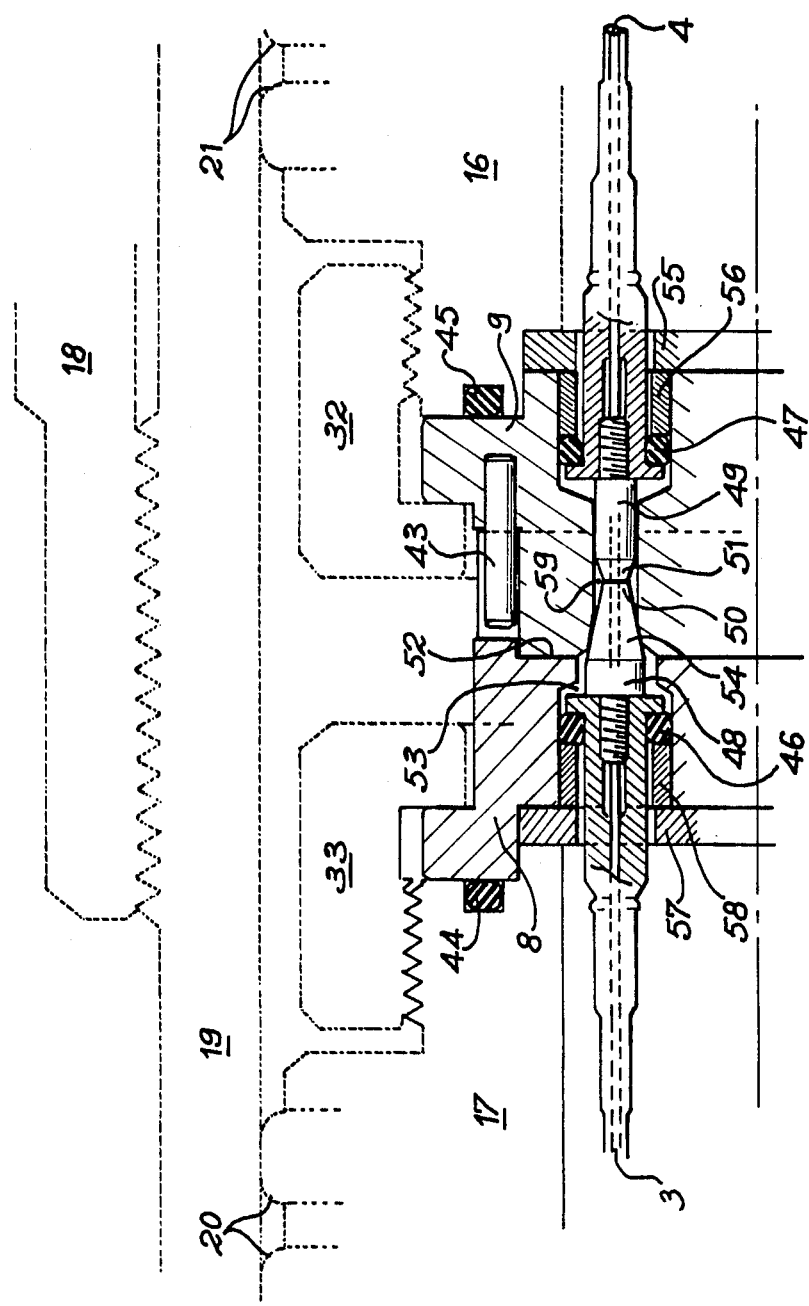

Other features of the present invention will appear from the following description, given merely by way of example, with respect to the accompanying drawing, in which:

FIG. 1 is a diagrammatic cross-section of a connector according to the present invention;

FIG. 2 diagrammatically represents some of the fibres of the connector of FIG. 1, in the vicinity of their extremities to be coupled, according to a first embodiment;

FIG. 3 represents the connector of FIG. 1 in more detail, in longitudinal section, in the vicinity of the fibre junction, according to said first embodiment of the connector; and FIG. 4 is a diagrammatic longitudinal cross-section of the connector of FIG. 1, in the vicinity of the fibre junction, in a second embodiment of the connector according to the present invention.

In FIG. 2 is shown in more detail the junction of the extremities of fibre segments inside the connector, according to a first embodiment of the latter. Said connector comprises means 1, 2 for retaining the extremities of fibres 3, 4 to be connected, and also means for assembling and aligning said thus-retained fibres; these assembling and aligning means permit the plane front surfaces 5, 6 of the fibres to be connected opposite to each other, in order to align the optical axes of said fibres. Said means are constituted by a barrel 7 in two parts 8, 9 provided with bores in which are respectively engaged the retaining means 1, 2 of the extremities of the fibres to be connected. Said two parts of the barrel have front surfaces 10, 11 opposite to each other, said front surfaces being parallel to the front surfaces 5, 6 of the respective fibres and also of the members for aligning the fibres to be connected.

In this first embodiment of the connector according to the present invention, said alignment members comprise at least one positioning stud 12, engaged in parts 8 and 9 of the barrel.

Quite obviously, there may be provided any number of such positioning studs for aligning the two barrel-parts and, therefore, the fibres supported by said two parts; usually, two positioning studs should be provided for ensuring a fair alignment. These positioning studs will be described later on in more detail.

In the above first embodiment of the connector according to the present invention, the means 1, 2 for retaining the fibres to be connected are constituted by rings in which are engaged the extremities 3, 4 of the fibres to be connected, said fibres being maintained inside said rings, e.g. by adhesive means. A sheath 14 surrounds each of the fibres to be connected, whereas a main sheath 15 surrounds the whole pack of fibres.

As will be seen later on in more detail, removable means, with the help of abutment means, maintain the front surfaces of the two barrel parts in contact with each other, in such manner that the front surfaces of the fibres to be connected be slightly spaced, such a slight spacing preventing the fibre extremities from being damaged. In order to obtain a calibrated spacing, one uses a special tooling constituted by a positioning barrel symmetrical with respect to the barrel to be calibrated, in which have been fixed fibres, the tips of which extend beyond the front surface by a distance that is half the desired spacing. That positioning barrel is arranged opposite each of the connector barrel, so as to introduce the fibres of the two connector barrels by said distance. The accuracy thus obtained is very satisfactory and fairly reproducible. Said positioning barrel is not shown in the figures. The abutment means are constituted by members 16, 17 adapted to support each of the barrel parts, respectively; the above removable means are constituted by rings 18, 19, adapted to rest against abutment members 16, 17, respectively, said rings permitting to maintain the front surfaces of the barrel two parts in contact with each other. Ring 18 is internally threaded, whereas ring 19 is outwardly threaded, the two threads mating each other; for assembling the connector, these two rings are screwed together.

The connector according to the present invention also comprises resilient means 20, 21 to be described later on in more detail, said means maintaining a fair tightness about the front surfaces of the barrel two parts inside rings 18 and 19.

Positioning stud 22 permits to achieve the positioning of abutment 16 with respect to ring, or sleeve, 19 during assembly.

Said connector, in addition, in both embodiments of the present invention, is provided, as an extension of the abutment means and in one piece with the latter, with a sleeve 23 through which the fibres to be connected pass via a sealed passage 24. Said sleeve 23 is provided with a hollow portion 25 for storing a length of fibre greater than the length of said hollow portion of said sleeve. Said sleeve also comprises a ring 26, adapted to be screwed to the extension of abutment member 16; tightness with respect to the outside is provided by means of resilient joints 27, 28.

For mounting ring 18, member 16 is screwed in sleeve 23; the tightness of such a junction is ensured by, e.g., an O-ring (not numbered).

At 29 is shown the position occupied by ring 26 when the latter has been removed. Sealed passage 24 is constituted by a bored nut 30 screwed in extremity 13 of the sleeve; that nut, in view of the conical shape of the base thereof, permits to act on a clamp 31, of the "tulip type", gripping the sheath 15 surrounding the whole pack of optical fibres. Said clamp of "the tulip type" is a ring, a conical extremity of which is provided with a slit, in order that the tightening of nut 30 induces the tightening of sheath 15. Sleeve 23 stores a certain length of optical fibres, so as to provide the connector with a better flexibility in the axial direction of the fibres. Said sleeve also permits the repair of extremities of one or of several fibres to be connected when, e.g., a failure in the assembly makes it necessary to change one or several retaining rings. Resilient joints 27, 28 and 32a provide a fair tightness between the inside of sleeve 23 and the outside.

As will be seen later on in more detail, the resilient sealing means 20 and 21 have the same function. Quite obviously, a sleeve similar to sleeve 23 might be provided on the opposite portion of the connector, in the vicinity of abutment member 17.

FIG. 3 represents the connector of FIGS. 1 and 2 in more detail, in longitudinal section, in the vicinity of the fibre junction, for the first embodiment of the connector. Members similar to those of the previous figures bear the same reference numerals.

At 12 is shown one of the studs for positioning the two parts 8, 9 of the barrel; that stud permits to position said two parts correctly, so as to align fibres 3 and 4; the retaining rings of the fibre extremities are shown at 1, 2 and are engaged in respective bores of said two parts of the barrel. The abutment members are shown at 16, 17, whereas the assembling sleeves are shown at 18, 19.

Finally, at 20, 21 are shown the resilient joints adapted to provide tightness about the front surfaces of the fibers to be connected.

As shown in the figure, the two parts 8, 9 of the barrel are assembled with abutment members 17, 16, through threaded sleeves 32, 33, said end sleeves resting against corresponding shoulders of the two parts of the barrel. Flexible joints 34, 35, 36 and 37 provide tightness between the front surfaces of the two parts of the barrel and the hollow portions 38, 39 of abutment members 16, 17.

Finally, in that figure, is shown the stud 22 for positioning abutment members 16 with respect to the assembling sleeve 19. Similarly, are shown at 40 and 41 studs for positioning each of the barrel parts with respect to the corresponding abutment members. These various studs provide the positioning of the various members forming the connector, and, in addition, they prevent, during assembly, abutment members and the two parts of the barrel from rotating within sleeves 18 and 19. Screw 42 is adapted to immobilise abutment 17 inside sleeve 19. With such an arrangement, tightness is ensured about the front surfaces of the fibres to be connected and, in addition, said fibres are brought in perfect alignment.

In FIG. 4 is shown, in diagrammatic longitudinal section, a second embodiment of the connector according to the present invention, in the vicinity of the fibre junction. The members similar to those of the previous figures bear the same reference numerals.

In FIG. 4 are also shown the two parts 8, 9 of the barrel, assembling sleeves 18, 19, abutment members 16, 17 with their respective end sleeves 32, 33; the function of stud 43 shown in that figure is essentially to prevent the operator from wrongly positioning the two parts of the barrel with respect to each other, the mounting operation being thus foolproof. Tightness about the front surfaces of the two parts of the barrel is provided by annular resilient joints 44, 45, 46, 47.

In said second embodiment, the means for retaining the extremities of the fibres are constituted by rings 48, 49, rendered integral with said fibres, e.g., by adhesive means; the front surfaces 50, 51 of said rings correspond to the respective front surfaces of the fibres they maintain.

In the first part 9 of the barrel, the bores containing rings 49 are so designed that the front surfaces of said rings be retracted with respect to the front surface 52 of said first part 9 of the barrel. In the second part 8 of the barrel, the bores 53 are so designed that the front surfaces 50 of rings 48 be ahead of the front surface of said second part 8 of the barrel. Accordingly, the junction of the extremities of fibres 4 and 5 is carried out in the first part 9 of said barrel.

In the second embodiment of the connector according to the present invention, the members for aligning the fibres are constituted by the extremities of rings 48, engaged in the second part 8 of the barrel; these rings have, at their respective ends, an outer surface 54, of conical shape, situated ahead of the front surface of the second part 8 of the barrel; said conical outer surface is engaged against the partly conical inner surface of the corresponding bores of the first part of the barrel. Therefore, it is no longer necessary to insert, between the two parts of said barrel, alignment studs. Contact between said two parts 8 and 9 of the barrel is provided by abutment members 16, 17, resting against cross-members 55, 56 and 57, 58. Said cross-members act on the shoulders of rings 48 and 49 through resilient joints 46, 47. Thus, in view of such an arrangement, the optical fibres are perfectly aligned by the end rings of said fibres, whereas tightness about the front surfaces is ensured by the various sealing joints shown in the figure. In addition to providing tightness, these joints give the connector a good flexibility, in particular as regards transverse mechanical stresses.

Finally, in that second embodiment of the present invention, in view of the conical shape of the extremities of the fibre retaining rings, there remains a free space 59 around the fibre junction. Said free space can be filled, e.g., by an optical coupling liquid.

The connector such as disclosed above provides a perfect tightness of the fibre junction with respect to the environment; moreover, said connector provides the whole assembly with a fair flexibility, in compliance with the embedding of the various connected members. The front surfaces of the fibres are slightly spaced so as to ensure the protection of the surfaces of the fibre extremities.

Quite obviously, various changes can be made in the connector such as described hereabove, without going beyond the scope of the present invention.

What is claimed is:

1. A connector for optical fibres comprising means (1, 2) for retaining the extremities (3, 4) of fibres to be connected, means (7) for assembling and aligning the thus-retained fibres, said assembling and aligning means being adapted to maintain the plane front surfaces (5, 6) of the fibres to be connected opposite to each other, so that the optical axes of said fibres be aligned, wherein said aligning and assembling means (7) contain a barrel in two parts (8, 9) provided with bores in which are respectively engaged the retaining means of said extremities to be connected, said two parts of said barrel having front surfaces (5, 6) opposite to each other and parallel with those of the fibres, as well as means (12) for aligning said fibres to be connected, removable means (18, 19), an internal portion of which is adapted to maintain said front surfaces (5, 6) of the two parts of said barrel in contact with each other through abutment means (16, 17), and resilient means (20, 21) adapted to maintain tightness about said front surfaces (5, 6) of the two parts of said barrel, inside said removable means (18, 19).

2. A connector according to claim 1, said connector comprising, in addition, as an extension of said abutment means (16, 17) and in one part with the latter, a sleeve (23) through which the fibres to be connected pass via a sealed passage (24), said sealed passage being so constituted as to permit the storage, inside said sleeve, of a fibre length greater than the inner length of said sleeve.

3. A connector according to claim 2, wherein said means (1, 2) for retaining the extremities of fibres are constituted by rings respectively integral with the extremity of each fibre, said rings being engaged in said barrel bores, in such manner that the front surface of each of said rings corresponds to the front surface of the respective fibre, the front surfaces of each fibre and of its respective ring being retracted with respect to the front surface of the corresponding part of said barrel.

4. A connector according to claim 3, wherein said means for aligning fibres comprise at least one positioning stud (12) adapted to be engaged in each of said parts of said barrel.

5. A symmetrical barrel for positioning fibres in each part of the barrel of the connector according to claim 4, said positioning barrel being constituted by a part symmetrical with that portion of the connector barrel in which the fibres are to be positioned, positioning fibre tips being fixed in said symmetrical portion, opposite the bores of the respective part of the connector barrel, in such manner that said tips protrude from the front surface of said symmetrical portion, opposite the front surface of the respective part of said connector barrel, by a distance equal to half the desired spacing.

6. A connector according to claim 2, wherein said means for retaining the extremities of fibres are constituted by rings (48, 49) integral with each fibre at the extremity thereof, in such manner that the front surface of each of said rings corresponds to the front surface of the respective fibre, the bores in a first part (9) of said barrel being so designed that the front surfaces of said rings be retracted with respect to the front surface of said first part (9) of said barrel, the bores in the second part (8) of said barrel being so designed that the front surfaces of said rings be ahead of the front surface of said second part (8) of said barrel, so that the junction of the fibre extremities is obtained in said first part (9) of said barrel, said means for aligning the fibres being constituted by said rings of said second part of said barrel, said rings having an outer surface (50, 51) of conical shape in the portion thereof situated ahead of the front surface of said second part (8) of said barrel, said conical outer surface being engaged in the partly conical inner surface of the corresponding bore of said first part (9) of said barrel.

* * * * *